(12) United States Patent
Tortola

(10) Patent No.: US 10,593,233 B2
(45) Date of Patent: Mar. 17, 2020

(54) APPARATUS AND METHOD FOR LAPAROSCOPIC SKILLS TRAINING

(71) Applicant: VTI Medical, Inc., Waltham, MA (US)

(72) Inventor: Angelo Tortola, Lexington, MA (US)

(73) Assignee: VTI Medical, Inc., Waltham, MA (US)

( * ) Notice: Subject to any disclaimer, the term of this patent is extended or adjusted under 35 U.S.C. 154(b) by 0 days.

(21) Appl. No.: 15/933,541

(22) Filed: Mar. 23, 2018

(65) Prior Publication Data

US 2018/0218646 A1 Aug. 2, 2018

Related U.S. Application Data

(63) Continuation of application No. 13/217,238, filed on Aug. 24, 2011, now Pat. No. 9,959,785.

(60) Provisional application No. 61/376,621, filed on Aug. 24, 2010.

(51) Int. Cl.
*G09B 23/28* (2006.01)
(52) U.S. Cl.
CPC ................... *G09B 23/285* (2013.01)
(58) Field of Classification Search
CPC .............................. G09B 23/28; G09B 23/285
See application file for complete search history.

(56) References Cited

U.S. PATENT DOCUMENTS

| | | | |
|---|---|---|---|
| 5,403,191 A | 4/1995 | Tuason | |
| 5,620,326 A | 4/1997 | Younker | |
| 5,919,208 A | 7/1999 | Valenti | |
| 6,214,019 B1 | 4/2001 | Manwaring et al. | |
| 6,659,776 B1 | 12/2003 | Aumann et al. | |
| 7,594,815 B2 | 9/2009 | Toly | |
| 7,802,990 B2 | 9/2010 | Komdorfffer, Jr. et al. | |
| 7,997,903 B2 | 8/2011 | Hasson et al. | |
| 8,007,281 B2 | 8/2011 | Toly | |
| 2003/0032863 A1* | 2/2003 | Kazakevich | A61B 1/00105 600/173 |
| 2004/0033476 A1 | 2/2004 | Shun | |
| 2005/0084833 A1 | 4/2005 | Lacey et al. | |
| 2005/0142525 A1 | 6/2005 | Cotin et al. | |
| 2005/0149001 A1* | 7/2005 | Uchikubo | A61B 90/00 606/1 |
| 2007/0166682 A1 | 7/2007 | Yarin et al. | |
| 2009/0298028 A1* | 12/2009 | Saunders | G09B 19/003 434/258 |
| 2010/0081883 A1 | 4/2010 | Murray et al. | |

(Continued)

FOREIGN PATENT DOCUMENTS

WO 20130328847 A1 2/2013

OTHER PUBLICATIONS

International Search Report received for Patent Application No. PCT/US2012/052038, dated Dec. 7, 2012. 3 pages.

(Continued)

*Primary Examiner* — Timothy A Musselman
(74) *Attorney, Agent, or Firm* — Finch & Maloney PLLC

(57) ABSTRACT

A laparoscopic trainer platform assembly includes: a training platform; a base, configured to accommodate at least one target array; the target array including a planar surface upon which are disposed a plurality of protruding targets oriented at various angles on the base; a left side support for supporting the training platform on the base; and a right side support for supporting the training platform on the base.

22 Claims, 16 Drawing Sheets

(56) References Cited

U.S. PATENT DOCUMENTS

| | | |
|---|---|---|
| 2010/0167249 A1 | 7/2010 | Ryan |
| 2011/0199471 A1 | 8/2011 | Tomioka |
| 2012/0196258 A1 | 8/2012 | Geijsen et al. |
| 2012/0308977 A1 | 12/2012 | Tortola |

OTHER PUBLICATIONS

Korndorffer Jr., et al., "Development and Transferability of a Cost-effective Laparoscopic Camera Navigation Simulator", Surgical Endoscopy and Other Interventional Techniques, Feb. 2005, vol. 19, Issue 2, pp. 161-167.

\* cited by examiner

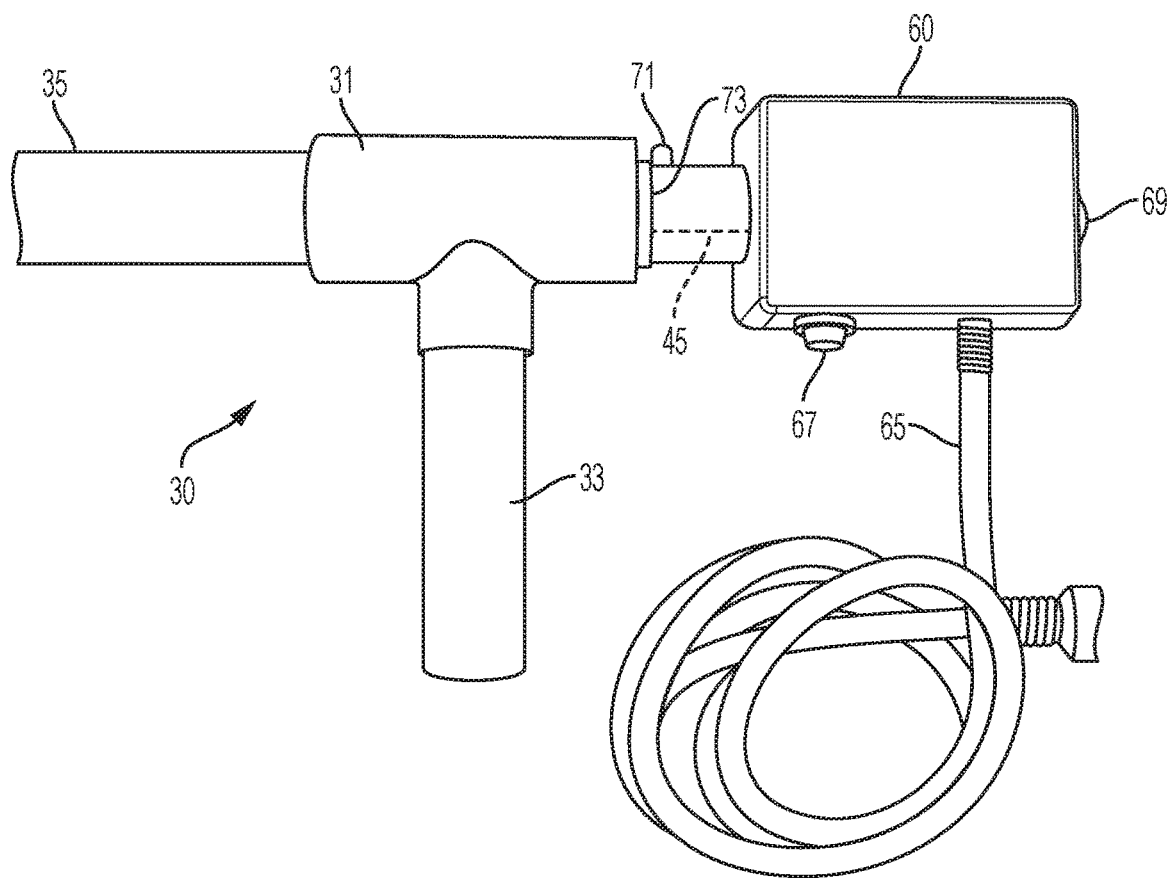
FIG. 3
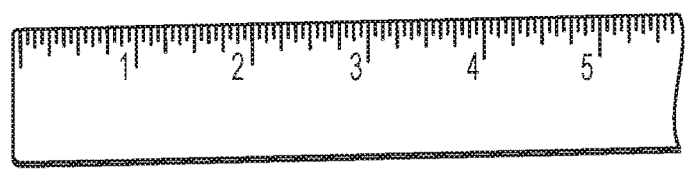
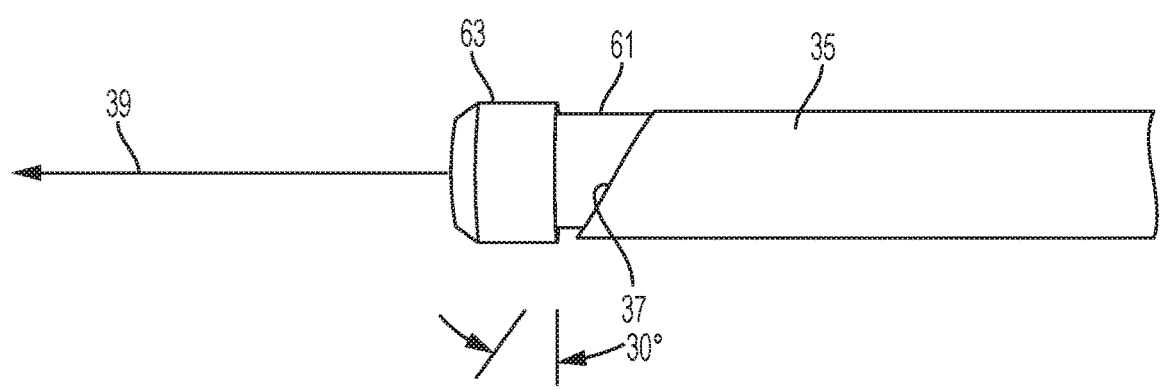
FIG. 4

APPARATUS AND METHOD FOR LAPAROSCOPIC SKILLS TRAINING

CROSS-REFERENCE TO RELATED APPLICATIONS

This application is continuation of U.S. application Ser. No. 13/217,238 filed Aug. 24, 2011, which claims the benefit of U.S. Provisional Patent Application No. 61/376,621 filed on Aug. 24, 2010. Each of these applications is herein incorporated by reference in its entirety.

FIELD OF THE DISCLOSURE

This disclosure relates to a system for surgeon training and, in particular, to an apparatus and method for training a surgeon in the fundamentals of laparoscopic surgery.

BACKGROUND

The procedure of laparoscopic surgery has been in general use for over a decade. However, it has been noted that cognitive and psychomotor skills required to perform laparoscopic surgery may be inadequate among some practitioners, resulting in patient discomfort from, for example, bile duct injuries. Accordingly, there is a need for a certifying examination by which a practitioner may be assessed for applicable cognitive knowledge, technical skills, and clinical judgment.

SUMMARY

In one aspect of the present disclosure, a laparoscopic skills training system comprises: a trainer platform assembly including a training platform; a base, the base configured to accommodate at least one target array; the target array including a planar surface upon which are disposed a plurality of protruding targets oriented at a plurality of angles on the base; a left side support for supporting the training platform on the base; and a right side support for supporting the training platform on the base.

In another aspect of the present disclosure, the laparoscopic skills training system may further comprise: an accessory kit including one or more of a suture block for a Penrose Drain, an appendage, a dexterity peg board, a plurality of single-circle gauze pads, and a plurality of double-circle gauze pads.

The laparoscopic skills training system may be used in conjunction with the performance of a number of different skill sets, including: assessing competence in use of an endoscope; assessing grasper dexterity using a peg board; evaluation of extracorporeal knot or intracorporeal knot tying in a "Penrose drain"; practice in placement of a pre-tied ligating loop or reusable endoloop around an organ appendage; precision cutting of a circular piece of gauze from a gauze pad; and practice in insertion of a catheter into a cannulation tube.

BRIEF DESCRIPTION OF THE DRAWINGS

The foregoing aspects, uses, and advantages of the present disclosure will be more fully appreciated as the same becomes better understood from the following detailed description of the present disclosure when viewed in conjunction with the accompanying drawings, in which:

FIG. 3 is a view of a central portion of the training endoscope of FIG. 2.

FIG. 4 is a view of an end portion of the training endoscope of FIG. 2 showing a video camera in a zero-degree position.

DETAILED DESCRIPTION

Figure 1:
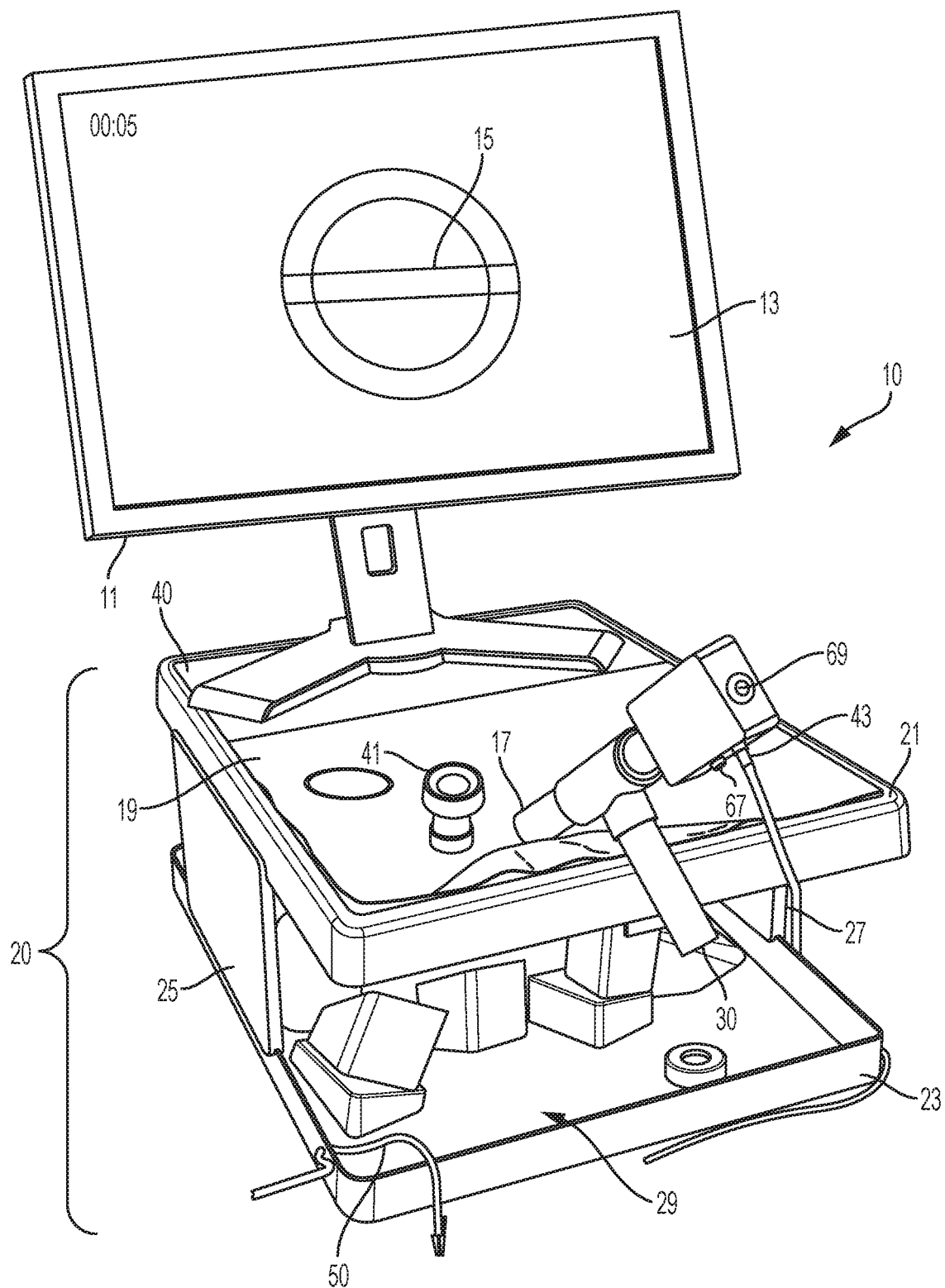
FIG. 1 is an isometric view of the basic elements of a laparoscopic skills training system, in accordance with the present disclosure.
Figure 2:
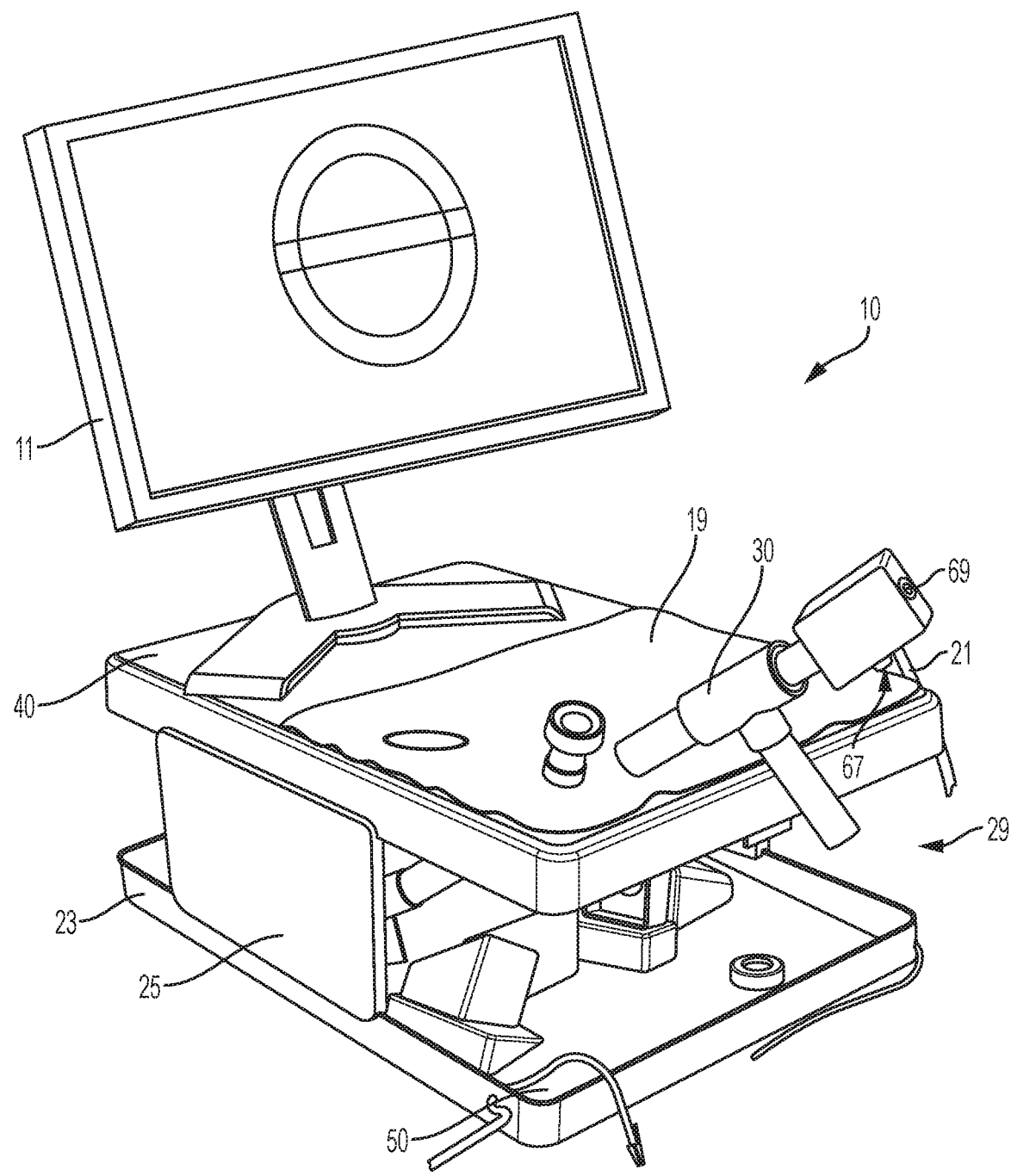
FIG. 2 is an isometric view showing a training endoscope retained in a training platform of the laparoscopic skills training system of FIG. 1.

There are shown in FIGS. 1 and 2 isometric views of the basic elements of a laparoscopic skills training system 10, in accordance with the present disclosure. The laparoscopic skills training system 10 includes a trainer platform assembly 20 comprising a training platform 21, a base 23, a left side support 25, and a right side support 27, where the trainer platform assembly 20 is secured to the base 23 by the left side support 25 and the right side support 27. A display device 11, such as a laptop or a computer monitor, may be placed on or near the trainer platform assembly 20, for use as described in greater detail below.

Emplacement of the training platform 21, the base 23, the left side support 25, and the right side support 27 as shown define a working volume 29 for performing training skills, as described in greater detail below. In an exemplary embodiment, the left side support 25 and the right side support 27 are removably attached to the training platform 21 and the base 23 such that these components can be disassembled for compact storage or transport.

The platform 21 provides a generally planar platform surface 40, here shown supporting a simulated skin 19, configured so as to enable a user to practice one or more tasks in a predefined skill set. The platform 21 may include one or more openings, configured so as to provide at least an endoscope opening 17, extending through the simulated skin 19 and the planar surface 40.

The endoscope opening 17 is sized and positioned to accommodate a standard endoscope (not shown) or a training endoscope 30. The standard endoscope or training endoscope 30 may be used in conjunction with a thirty-degree target array 50, as described in greater detail below. The platform surface 40 may further include a left port 41 and a right port 43, each sized and positioned to accommodate a grasper (not shown) for use as described in greater detail below.

Figure 5:
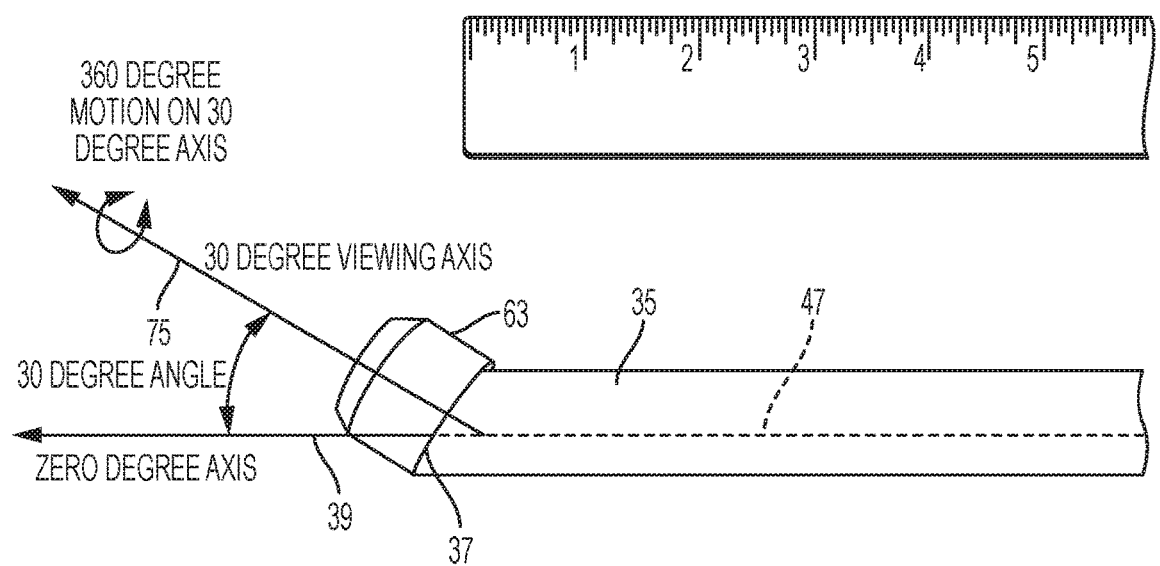
FIG. 5 is a view of an end portion of the training endoscope of FIG. 2 showing the video camera in a thirty-degree position.

The components and operation of the training endoscope 30 may be described with reference to FIGS. 3 through 5 in which are shown an endoscope housing 31 into which are fitted a handle 33 and a viewing barrel 35. The viewing barrel 35 has a first end fitted into the endoscope housing 31, as best shown in FIG. 3, and a second end having a skewed barrel end 37 oriented at about thirty degrees with respect to a barrel axis 39, as best shown in FIG. 4. An inner barrel 61 is slidably retained within the viewing barrel 35. The inner barrel 61 comprises a longer length than the length of the viewing barrel 35.

As best shown in FIG. 3, a video electronic module 60 is connected to a first end of the inner barrel 61, and a video camera 63 is connected to a second end of the inner barrel 61. An electronic cable 45 runs inside the length of the inner barrel 61 to convey electronic digital image data from the video camera 63 to the video electronic module 60, as is known in the art. An output cable 65 may be connected to an output of the electronic module 60 so as to provide an image 13, and optional electronically-generated cross hairs 15, on the display device 11 (shown in FIG. 1). The video electronic module 60 may include switches 67 and 69 to begin a countdown timer (shown in FIG. 1) and an elapsed-time timer (not shown), for example, for use in a training session.

In a first mode of operation, camera navigation skills are developed, the optical axis of the video camera 63 is generally aligned with the barrel axis 39, i.e., "zero degree axis." In a second mode of operation, best shown in FIG. 3, the video electronic module 60 is moved away from the endoscope housing 31, causing the inn barrel 61 to move rearward within the viewing barrel 35, until a latching button 71 protrudes to engage an end 73 of the viewing barrel 35. This causes the video camera 63 to pivot approximately thirty degrees so as to orient the camera optical axis along a 30-degree viewing axis 75, as best seen in FIG. 5.

An elastic member 47, disposed within the inner barrel 61, is configured and attached to the video camera 63 such that the video camera 63 is urged to rotate and to position itself against the skewed barrel end 37 of the viewing barrel 35 when the inner barrel 61 has moved rearward within the viewing barrel 35. If the latching button 71 is subsequently depressed, allowing the inner barrel 61 to move forward within the viewing barrel 35, the video camera 63 returns to the first mode of operation and the camera optical axis is again aligned with the barrel axis 39, or zero degree axis, as best shown in FIG. 4.

In an alternative embodiment, the angle of the video camera 63 can be varied continuously, in addition to using detents for viewing at zero degrees or thirty degrees. In the alternative embodiment, position indicators (not shown) may be provided on the inner barrel 61 such that the sliding movement of the inner barrel within the viewing barrel 35 can be adjusted so as to position the video camera 63 at varying angles, according to which position indicator on the inner barrel remains visible at the end of the viewing barrel 35.

Figure 6:
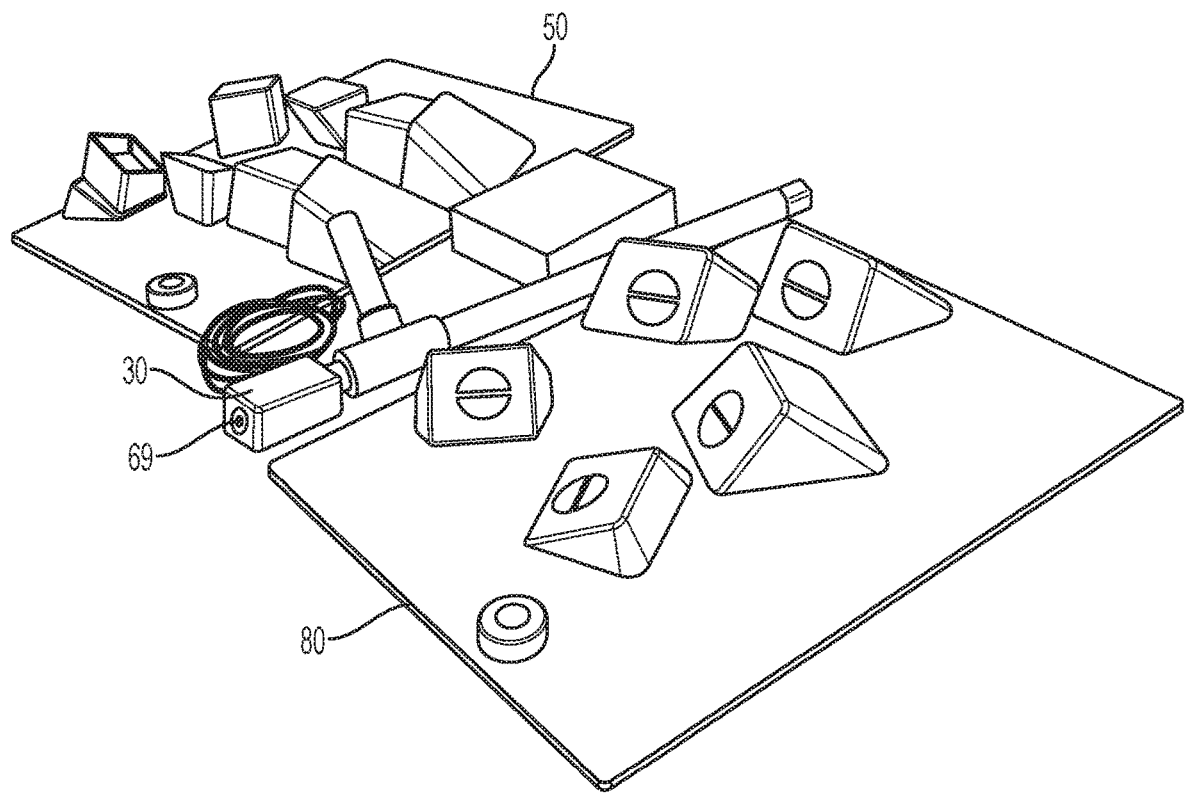
FIG. 6 is a view of the training endoscope of FIG. 2 with a zero-degree target array and a thirty-degree target array.

As best shown in FIG. 6, the training endoscope 30 can be used with either the thirty-degree target array 50, emplaced as shown in FIG. 1, or a zero-degree target array 80, which can be substituted for the thirty-degree target array in FIG. 1. As can be appreciated by one skilled in the art, either or both the thirty-degree target array 50 or the zero-degree target array 80 may be vacuum and heat-formed from a plastic sheet. When used with the zero-degree target array 80, the training endoscope 30 is placed into the first mode of operation in which the optical axis of the video camera 63 is aligned with the barrel axis 39. When used thirty-degree target array 50, the training endoscope 30 is placed into the second mode of operation in which the optical axis of the video camera 63 is aligned with the 30-degree viewing axis 75.

Figure 7:
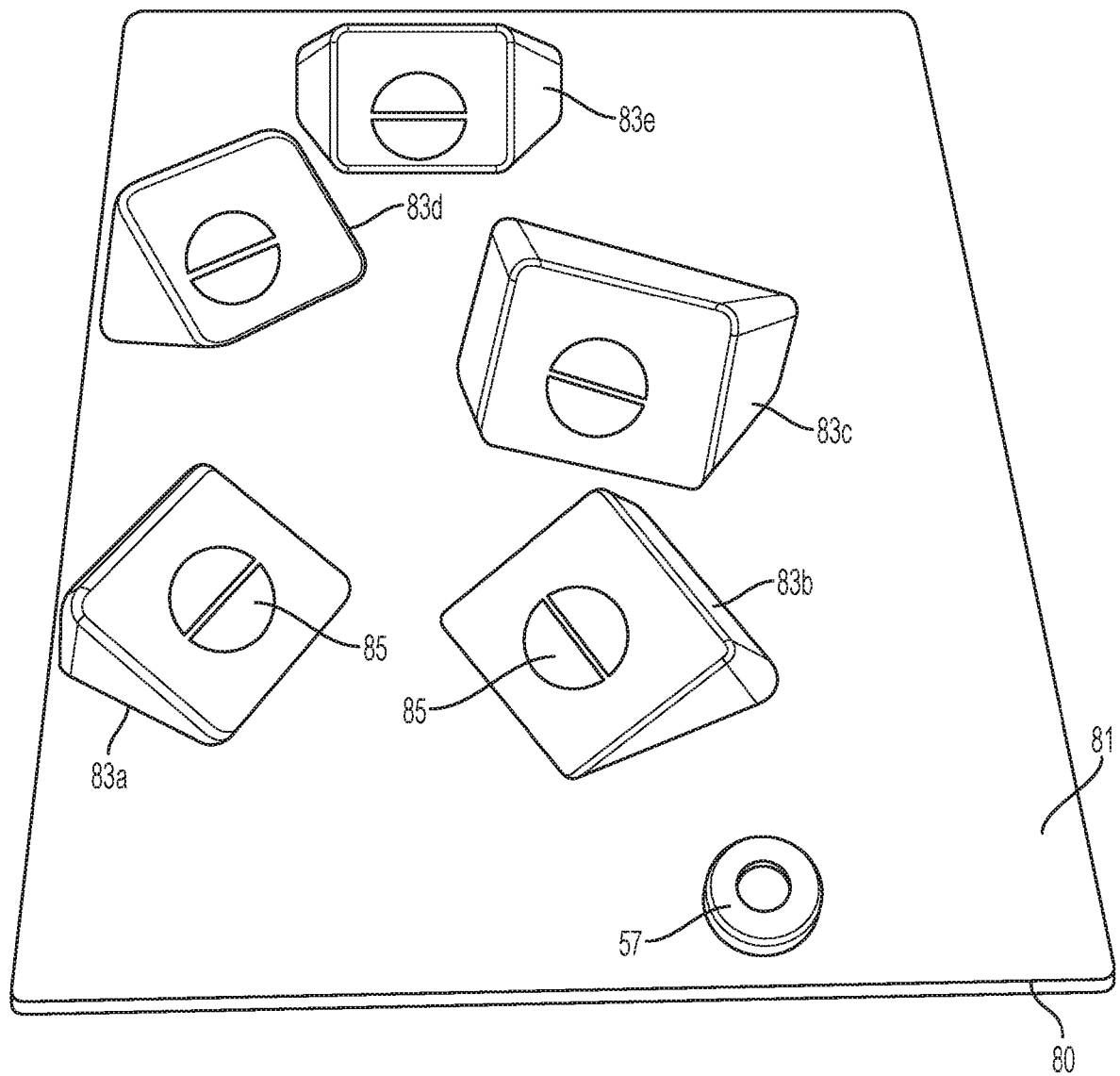
FIG. 7 is a detail view of the zero-degree target array of FIG. 6.

As best seen in FIG. 7, in an exemplary embodiment the zero-degree target array 80 may comprise a generally planar surface 81 from which protrude a plurality of raised features 83a-83e. Each of the raised features 83a-83e includes a surface having provided thereon a target 85. In performing a first skill set using the laparoscopic skills training system 10, the user begins by inserting the training endoscope 30 through the simulated skin 19 into the working volume 29 via the endoscope opening 17.

The training endoscope 30 is placed into the first mode of operation. The user conducts a first skill set by maneuvering the training endoscope 30 so as to successively acquire each of the targets 85 by the video camera 63 and superimpose each target 85 within the electronically-generated cross hairs 15 on the display device 11. Preferably, the series of acquisitions is performed within a predetermined amount of time. The predetermined time may be set by the user, via the switch 67, and a countdown time value may be displayed on the display device 11 (see FIG. 1). The zero-degree target array 80 may include a finger hole 57 to enable the user to remove the zero-degree target array 80 from within the base 23.

Figure 8:
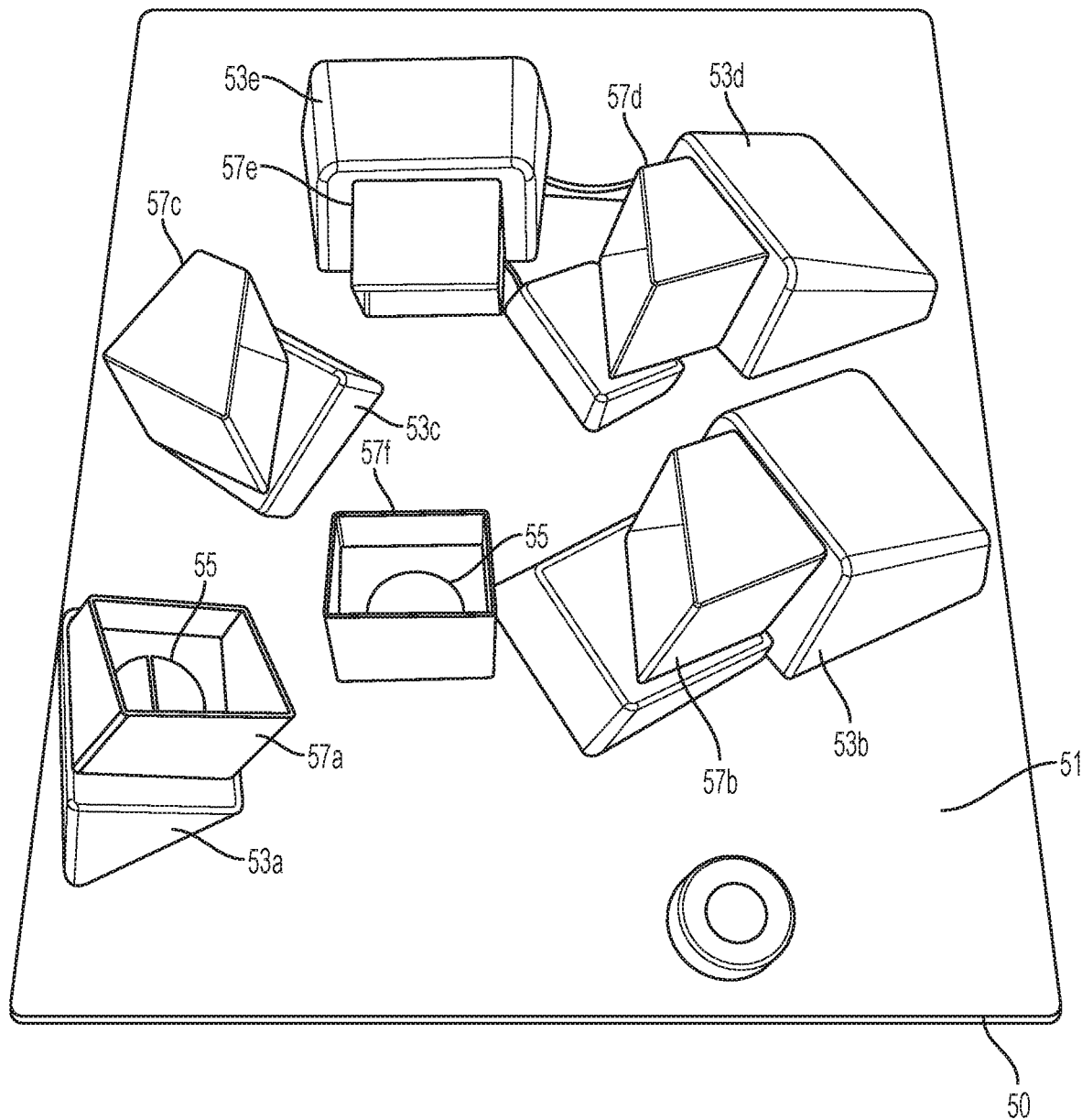
FIG. 8 is a detail view of the thirty-degree target array of FIG. 6.

As best seen in FIG. 8, in an exemplary embodiment the thirty-degree target array 50 may comprise a generally planar surface 51 from which protrude a plurality of raised features 53a-53e. Each of the raised features 53a-53e includes a surface having provided thereon the target 55. Each of the raised features 53a-53e also includes a respective cowl 57a-57e positioned so as to prevent a direct view of the respective target 55 from the endoscope opening 17. In performing a second skill set using the laparoscopic skills training system 10, the user inserts the training endoscope 30 into the working volume 29 via the endoscope opening 17, places the training endoscope 30 into the second mode of operation, and maneuvers the training endoscope 30 so that each of the targets 85 are successively acquired by the video camera 63 and appear within the electronically-generated cross hairs 15 on the display device 11 within a predetermined amount of time. The switch 69 may be used to begin an elapsed time, for example, and the video electronic module 60 may generate the elapsed time value for display on the display device 11.

Figure 9:
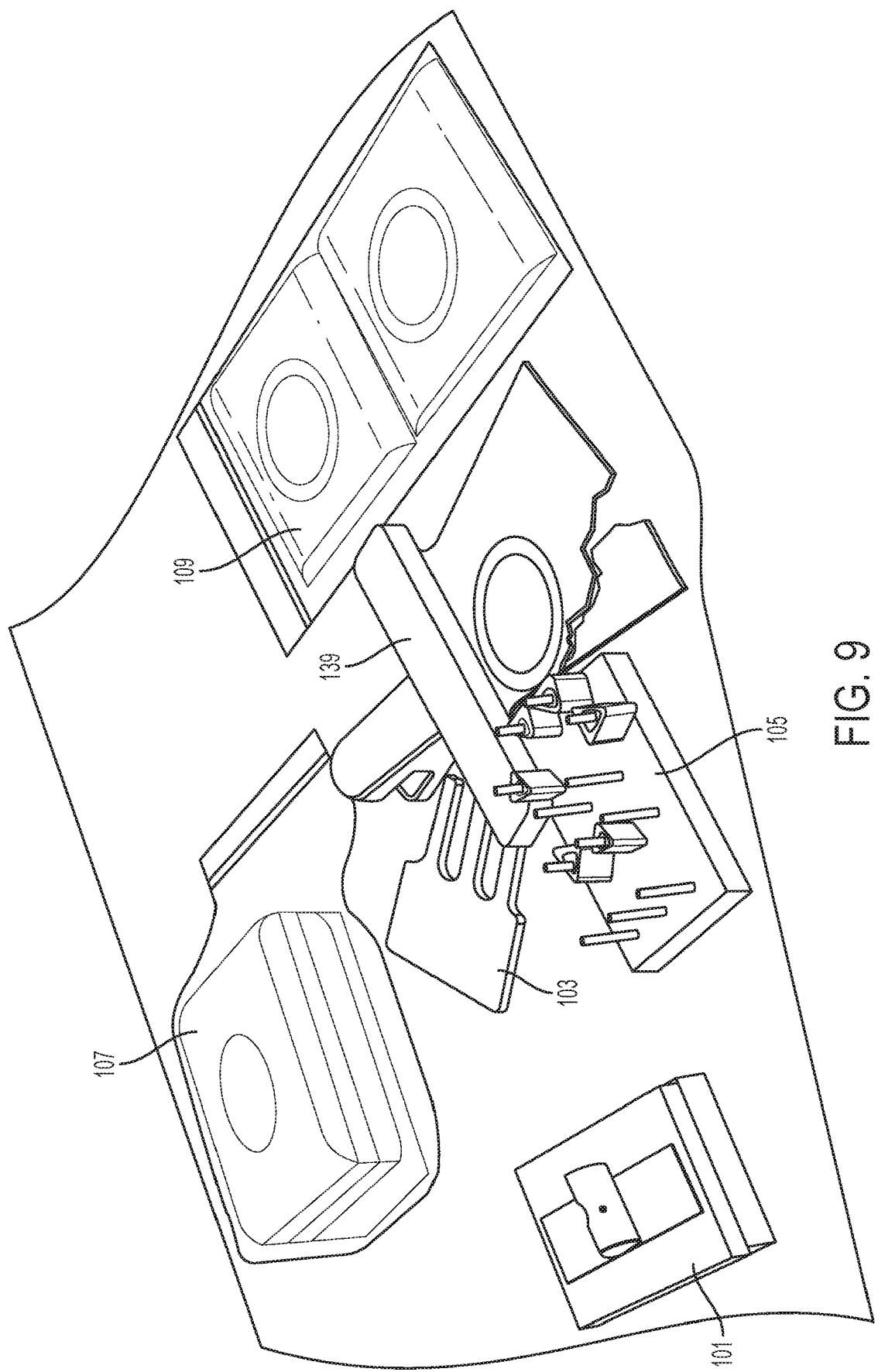
FIG. 9 is an exemplary embodiment of an accessory kit comprising a suture block with a Penrose Drain, a foam organ with appendages, a dexterity peg board, a plurality of single-circle gauze pad, and a plurality of double-circle gauze pads.

Additional skill sets may be performed using any of a plurality of Laparoscopic Surgery Training (LST) simulation components provided in an accessory kit 100, shown in FIG. 9. The accessory kit 100 may include a LST suture block 101, a LST foam organ 103 with appendages comprising a red foam material, a LST dexterity peg board 105, a LST single-circle gauze pad 107, and a LST double-circle gauze pad 109. Each of the LST suture block 101, the LST appendage 103, and the LST dexterity peg board 105 may include a mechanical fastener, such as a hook-and-pile fastener (not shown), on the underside of the respective component for removable attachment to a mating mechanical fastener, such as a hook-and-pile fastener (not shown), on the base 23. The mechanical fastener serves to prevent movement of the particular component while the user is performing a skill set, as described in greater detail below.

In an exemplary embodiment, the LST foam organ 103 may comprise two layers of a foam material, heat sealed at the perimeter of the foam organ 103 (with three appendages) so as to give the foam organ 103 a "puffy" configuration. It can be appreciated by one skilled in the art that the single circle and the double circle can be imprinted onto the respective gauze pads 107 and 109 by any practical means such as, for example, silk screening or stamping with ink.

Figure 10:
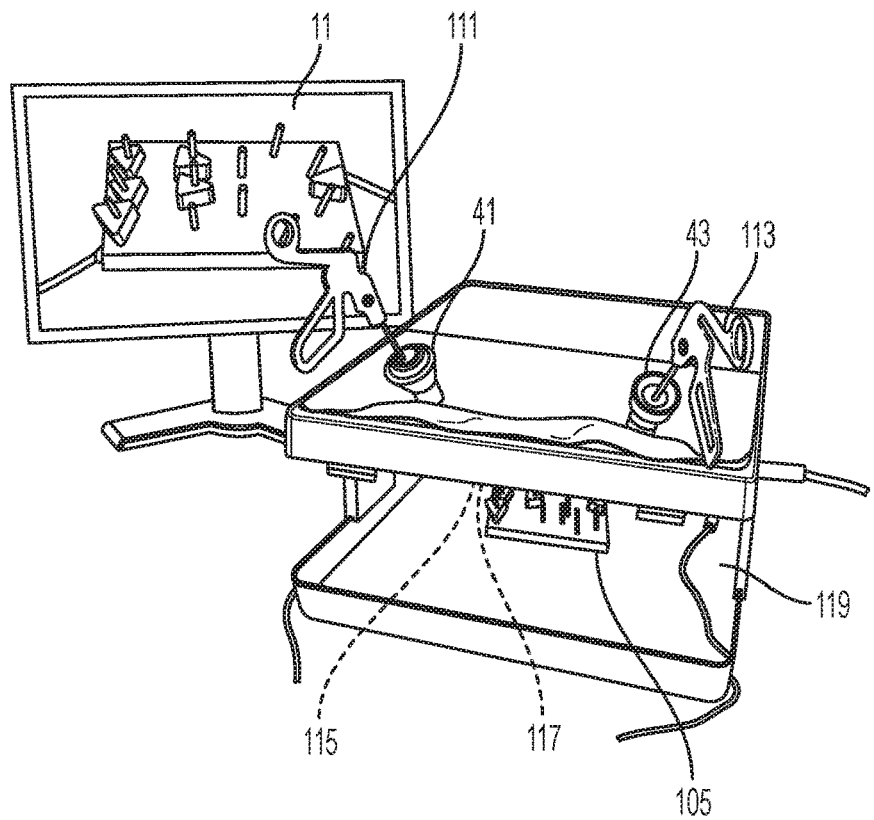
FIG. 10 is a perspective view of the dexterity peg board of FIG. 9 placed in a working volume of the laparoscopic skills training system of FIG. 1.
Figure 11:
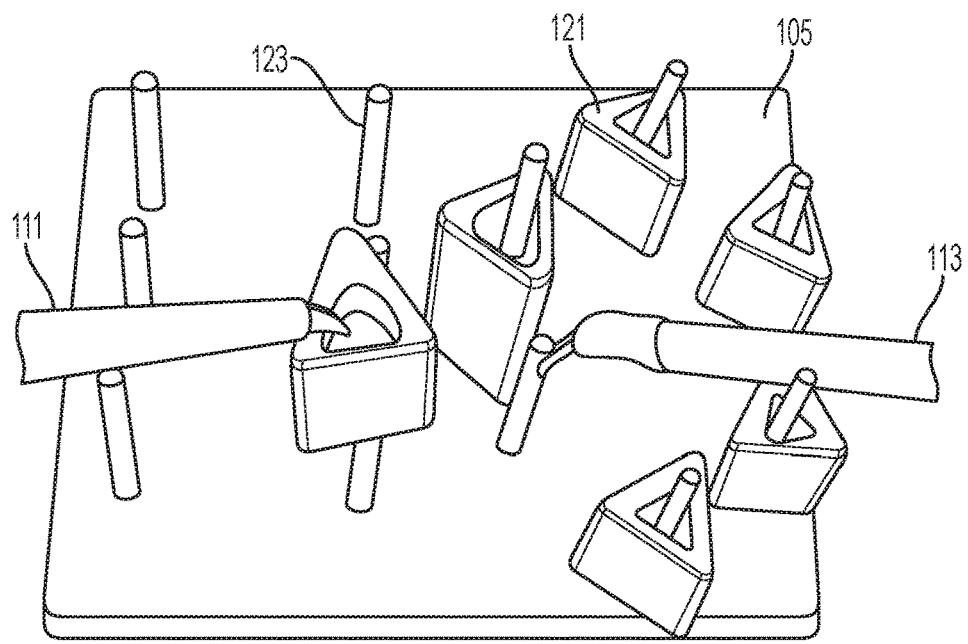
FIG. 11 is a detail view of the dexterity peg board of FIG. 10.

For example, in a third skill set, shown in FIGS. 10-11, the user can position a first grasper 111 through the left port 41 and a second grasper 113 through the right port 43, such that the graspers 111 and 113 protrude into a working volume 119. A video camera 115 and at least one light source 117 can be mounted to the underside of the platform 21 to illuminate the LST dexterity peg board 105, for example, and allow the user to view the actions of the graspers 111, 113 on the display device 11.

In an exemplary embodiment, the user may use the graspers 111, 113 to manipulate a plurality of triangular rings 121 among a plurality of pegs 123 on the LST dexterity peg board 105. The LST dexterity peg board 105 may be removably fastened to the base using the hook and pile fastening pair secured to the underside of the LST dexterity peg board 105 and to the surface of the base 23. In an exemplary embodiment, the triangular rings 121 may be fabricated by an extrusion process, or any other comparable fabrication process known in the relevant art.

The third skill set includes the process of transferring the plurality of triangular rings 121 from a first group of pegs 123 to a second group of pegs 123. A triangular ring 121 is grasped by the grasper 111, lifted from the corresponding peg 123, transferred to the grasper 113 in midair, and placed over another peg 123. Once all triangular rings 121 have been so transferred, the process may be repeated in reverse. In an exemplary embodiment, performance of the third skill set may be timed by using the video electronic module 60 with an elapsed or remaining time display provided on the display device 11.

Figure 12:
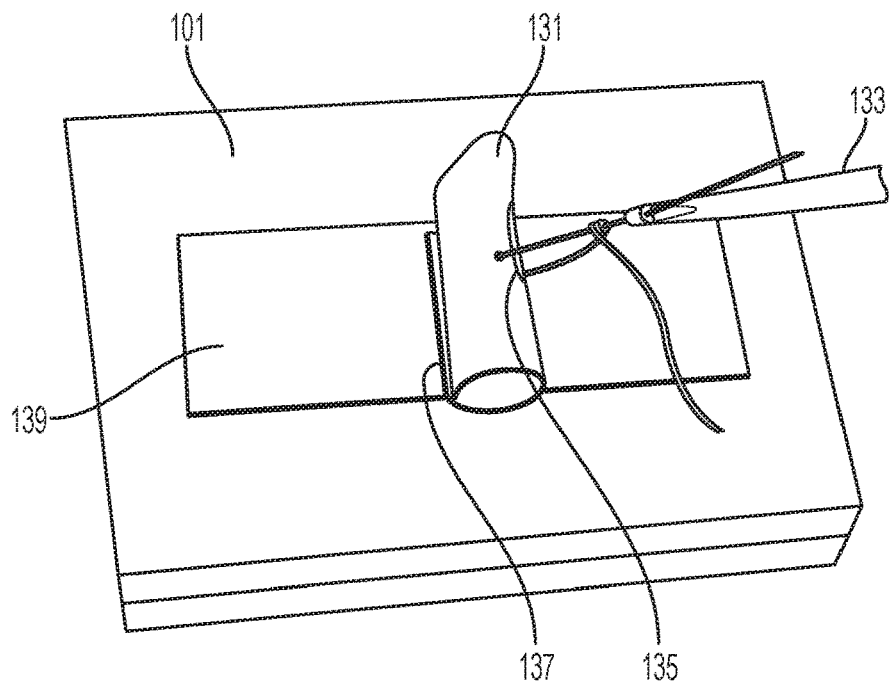
FIG. 12 is a detail view of the suture block with the Penrose Drain of FIG. 9 showing a practice suturing operation using an extracorporeal knot.

In a fourth skill set, shown in FIG. 12, the user performs a simple suture in a LST Penrose drain 131 that may be fabricated from an elastic material, such as rubber or latex. The user sutures the LST Penrose drain 131 using an extracorporeal knot by manipulating a knot-pusher 133 and a grasper (not shown). This operation requires the user to place a simple stitch through two marks on either side of a longitudinal slit 135 in the LST Penrose drain 131 and to tie the suture extra-corporeally, using the knot pusher 133 to slide the knot down. This suturing operation may be timed by using the electronic module 60.

The LST Penrose drain 131 may include a hook-and-pile fastener 137 for removable attachment to a corresponding hook-and-pile fastener 139 on the base 23. In an exemplary embodiment, the LST Penrose drain 131 may be fabricated by molding and may include the longitudinal slit 135 as part of the molding process. The two marks provided on the LST Penrose drain 131 are preferably produced by ink, or similar material, applied to the surface of the LST Penrose drain 131 by any method known in the art, including via manual application. A pair of protrusions (not shown) on the LST Penrose drain 131 may serve as guides in the application of the ink or similar material to the LST Penrose drain 131 to produce the two marks.

Figure 13:
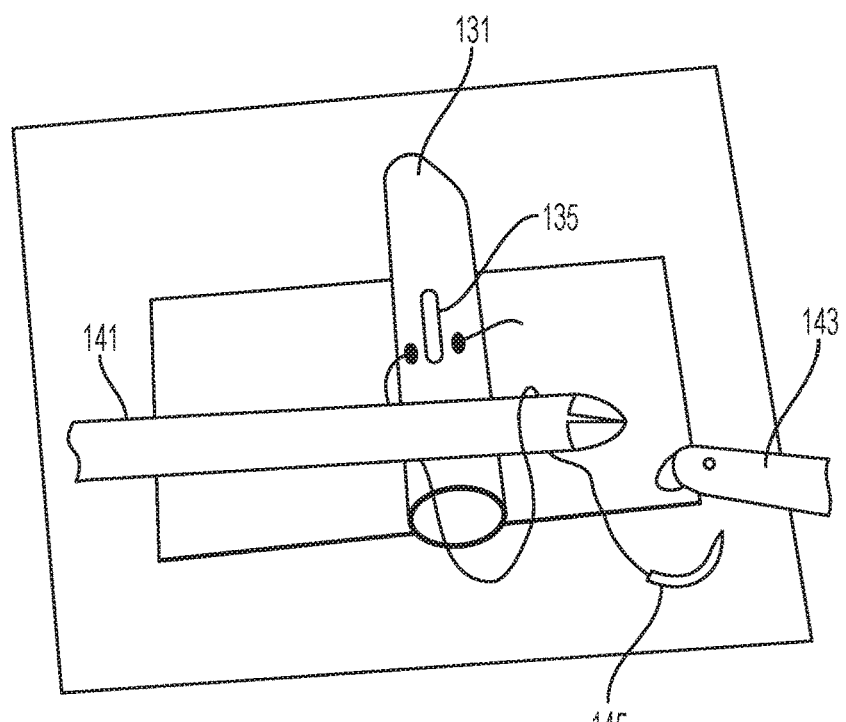
FIG. 13 is a detail view of the suture block of FIG. 9 showing a practice suturing operation using an intracorporeal knot.

In a fifth skill set, shown in FIG. 13, the user performs a simple suture in the LST Penrose drain 131 using an intra-corporeal knot by manipulating two needle drivers 141 and 143. This operation requires the user to place the suture through two marks in the longitudinal slit 135 and to tie the suture intra-corporeally, transferring a needle 145 between the needle drivers 141 and 143 between knot-tying throws. This suturing operation may be timed by using switches 67 and 69 (e.g., buttons) provided on the electronic module 60.

Figure 14:
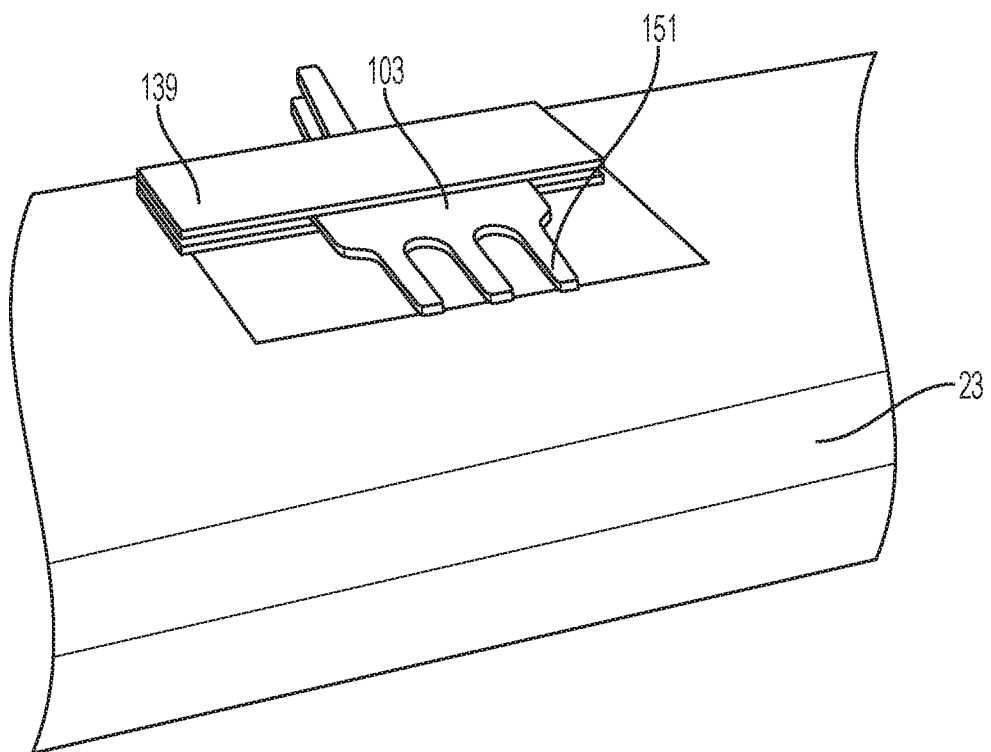
FIG. 14 is a detail view of the foam organ with appendages of FIG. 9.
Figure 15:
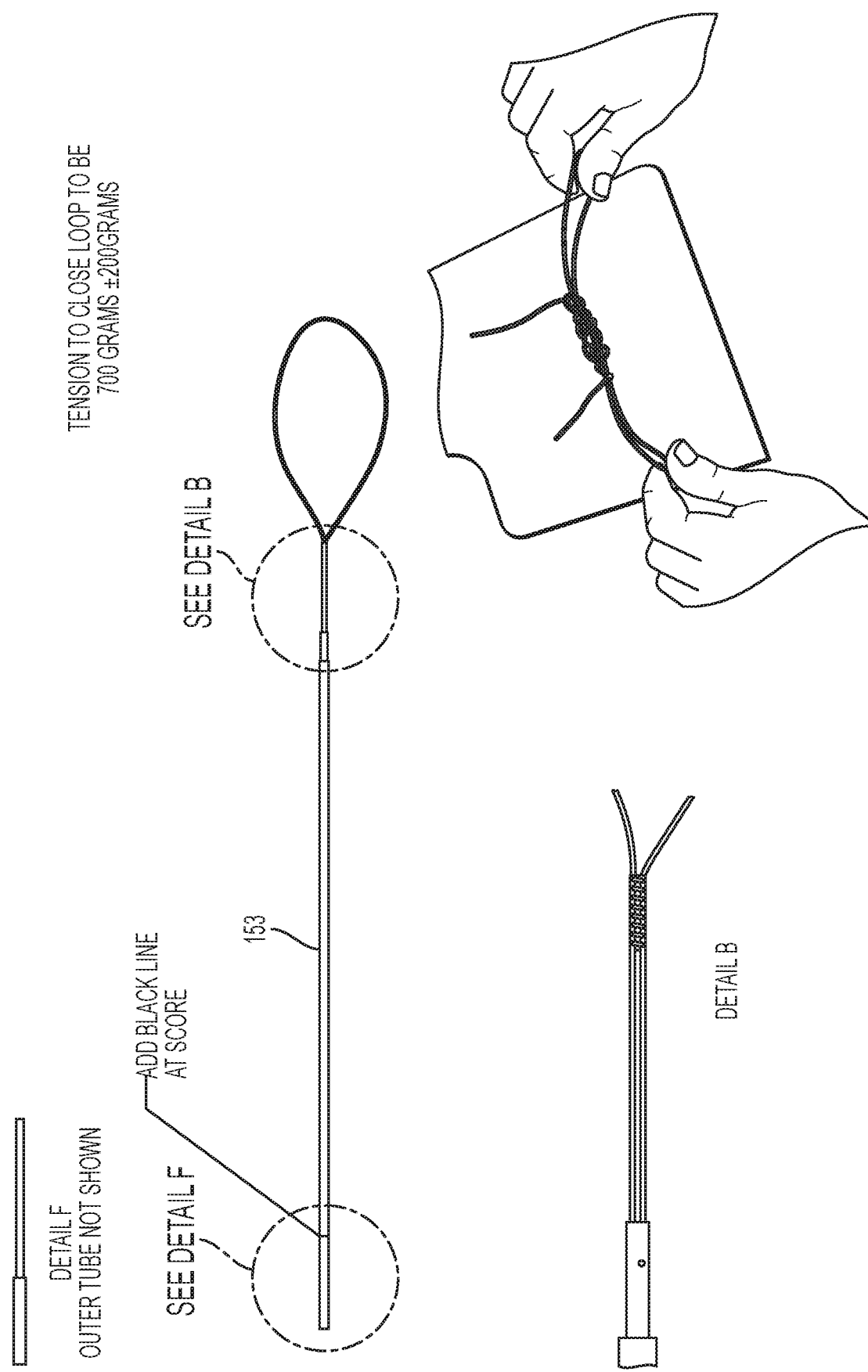
FIG. 15 is a diagrammatical view of a re-usable endoloop as may be used with the organ appendages of FIG. 14.

In a sixth skill set, shown in FIGS. 14 and 15, the user attaches the foam organ 103 to a fastener 139 which is secured to the base 23, such that a plurality of appendages 151 are free to move. The user can manipulate a grasper (not shown) to place a pre-tied ligating loop or reusable endoloop 153 around one of the appendages 151. The user can then secure the knot of the pre-tied ligating loop or reusable endoloop 153 on the appendage 151, and simulate cutting the thread with a grasper 111. This operation may be timed by using either of the switches 67 and 69 on the electronic module 60. In an exemplary embodiment, the reusable endoloop 153 may be placed into a folded sheet of corrugated paper (not shown) for protection in shipping or storage.

Figure 16:
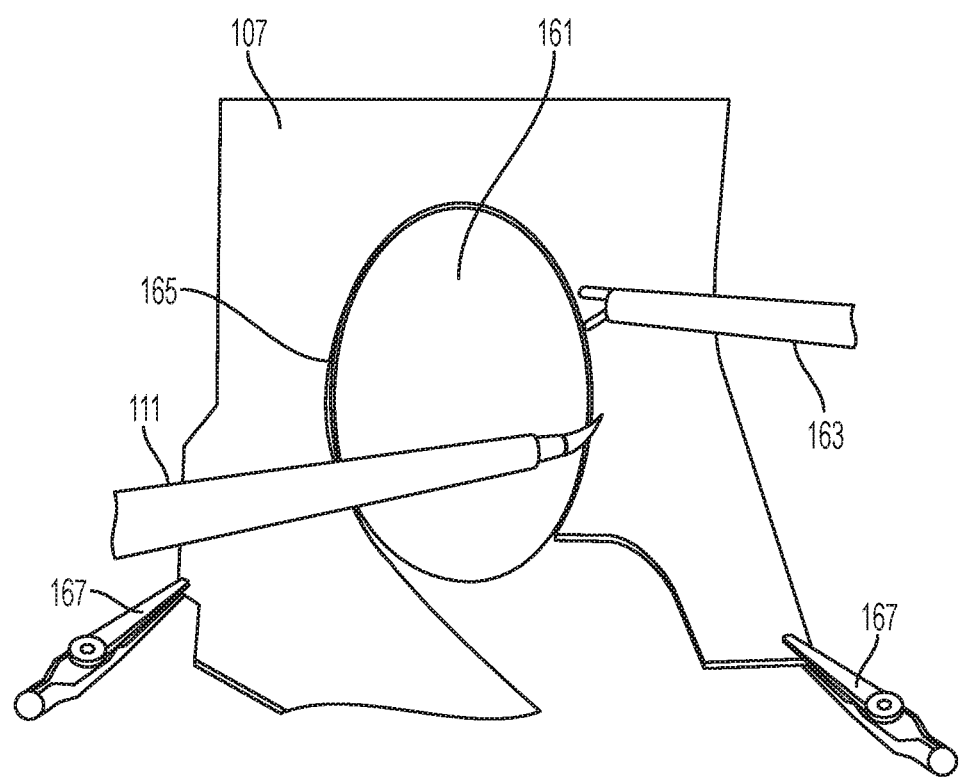
FIG. 16 illustrates a cutting procedure that may be performed using the single-circle gauze pad of FIG. 9.

A seventh skill set, shown in FIG. 16, includes the process of precision cutting a circular piece of gauze 161 from the LST single-circle gauze pad 107. A pair of clips 167, such as alligator clips, may be used to place the gauze in tension so as to enable cutting. Alternatively, a less skilled user may elect to cut the circular piece of gauze 161 from the LST double-circle gauze pad 109 (shown in FIG. 9). The LST single-circle gauze pad 107 may be grasped by the grasper 111, and cut using endoscopic scissors 163. A penalty may be assessed if the user deviates from a circular line 165. In an exemplary embodiment, performance of the seventh skill set may be timed by using the switch 67 (e.g., a button) or the switch 69 on the video electronic module 60 with an elapsed or remaining time display provided on the display device 11.

Figure 17:
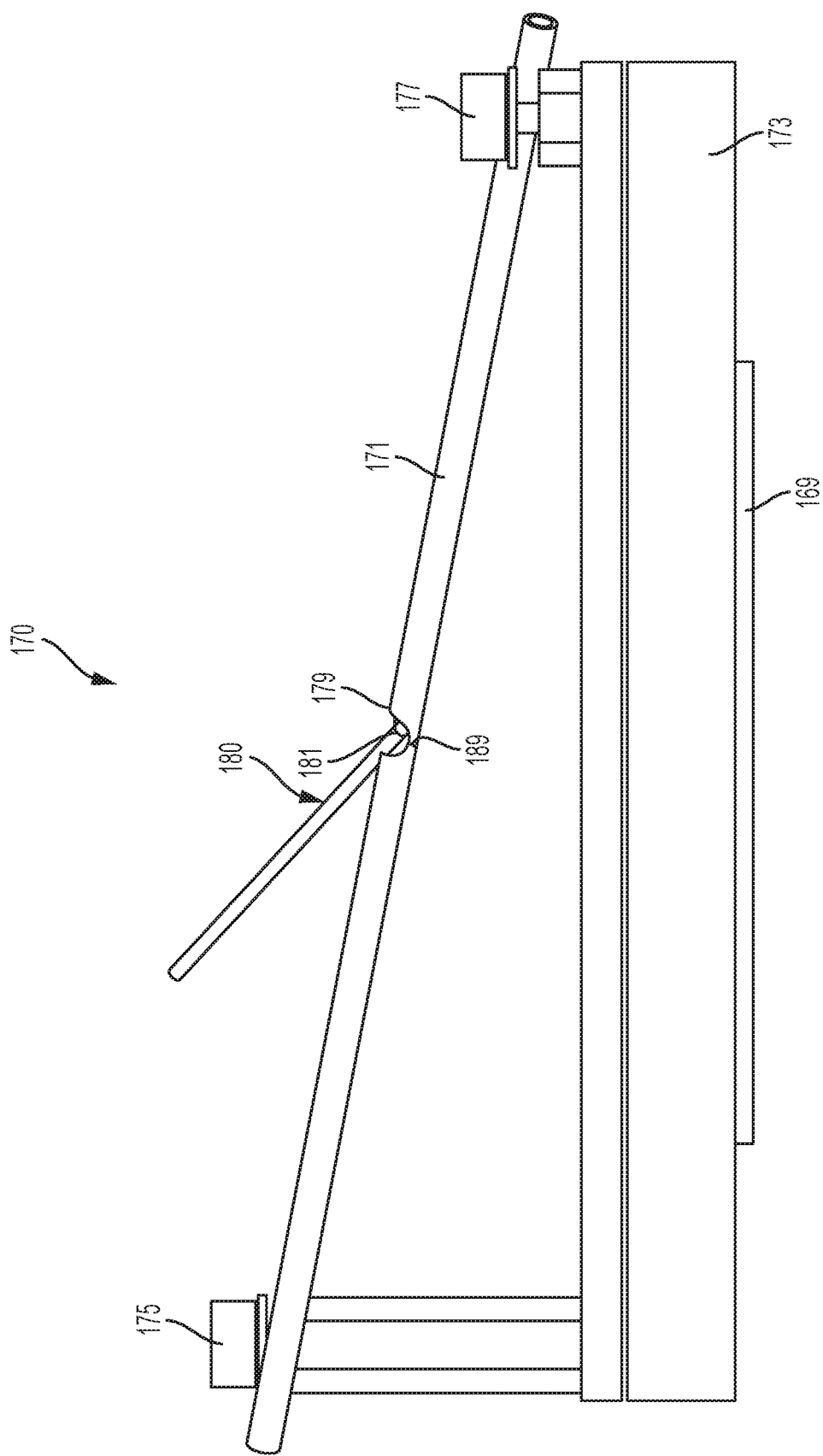
FIG. 17 is a diagrammatical illustration of a cannulation fixture suitable for insertion of a training catheter, in accordance with an exemplary aspect of the present disclosure.
Figure 18:
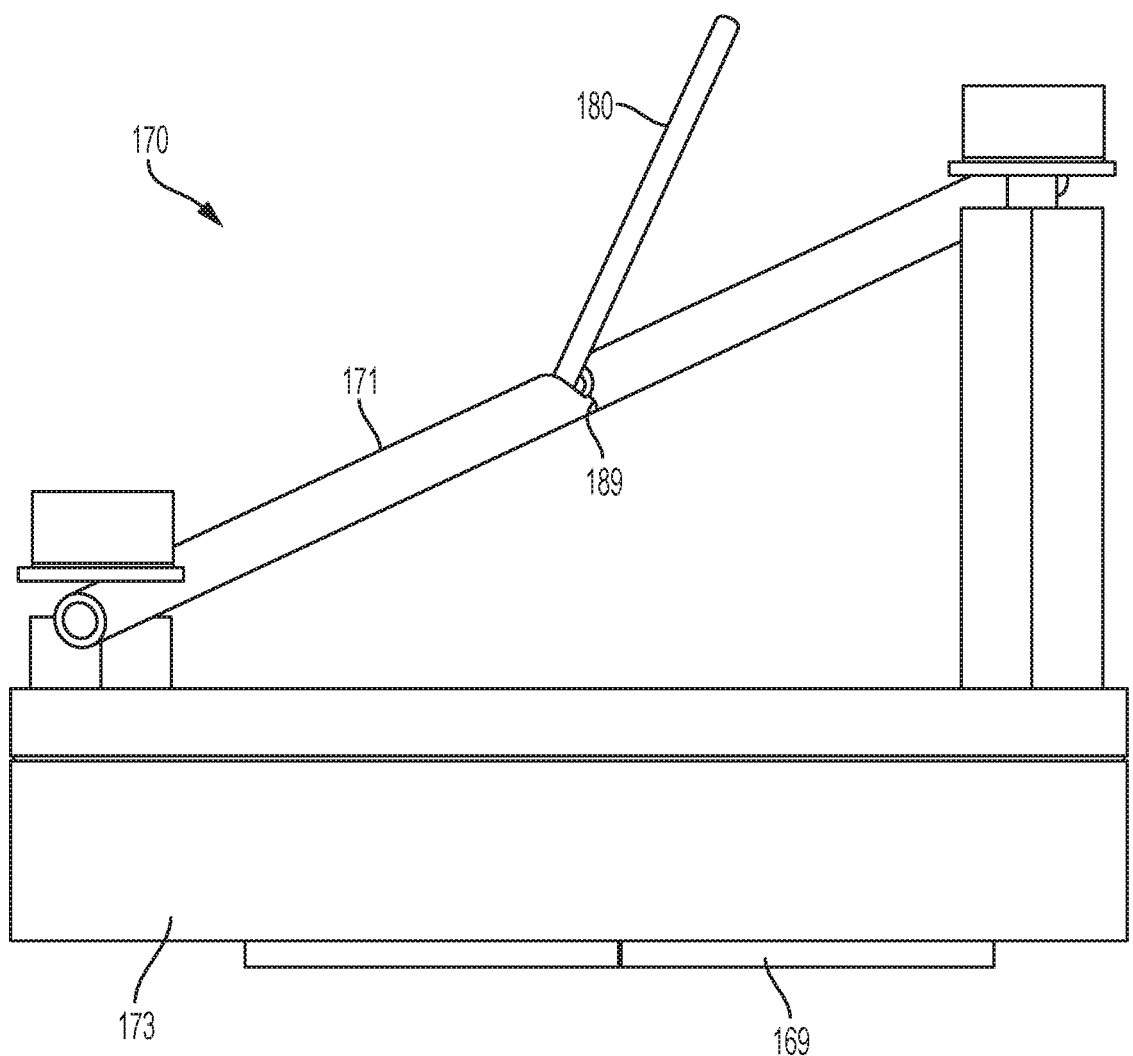
FIG. 18 is a side view of the cannulation fixture of FIG. 17.
Figure 19:
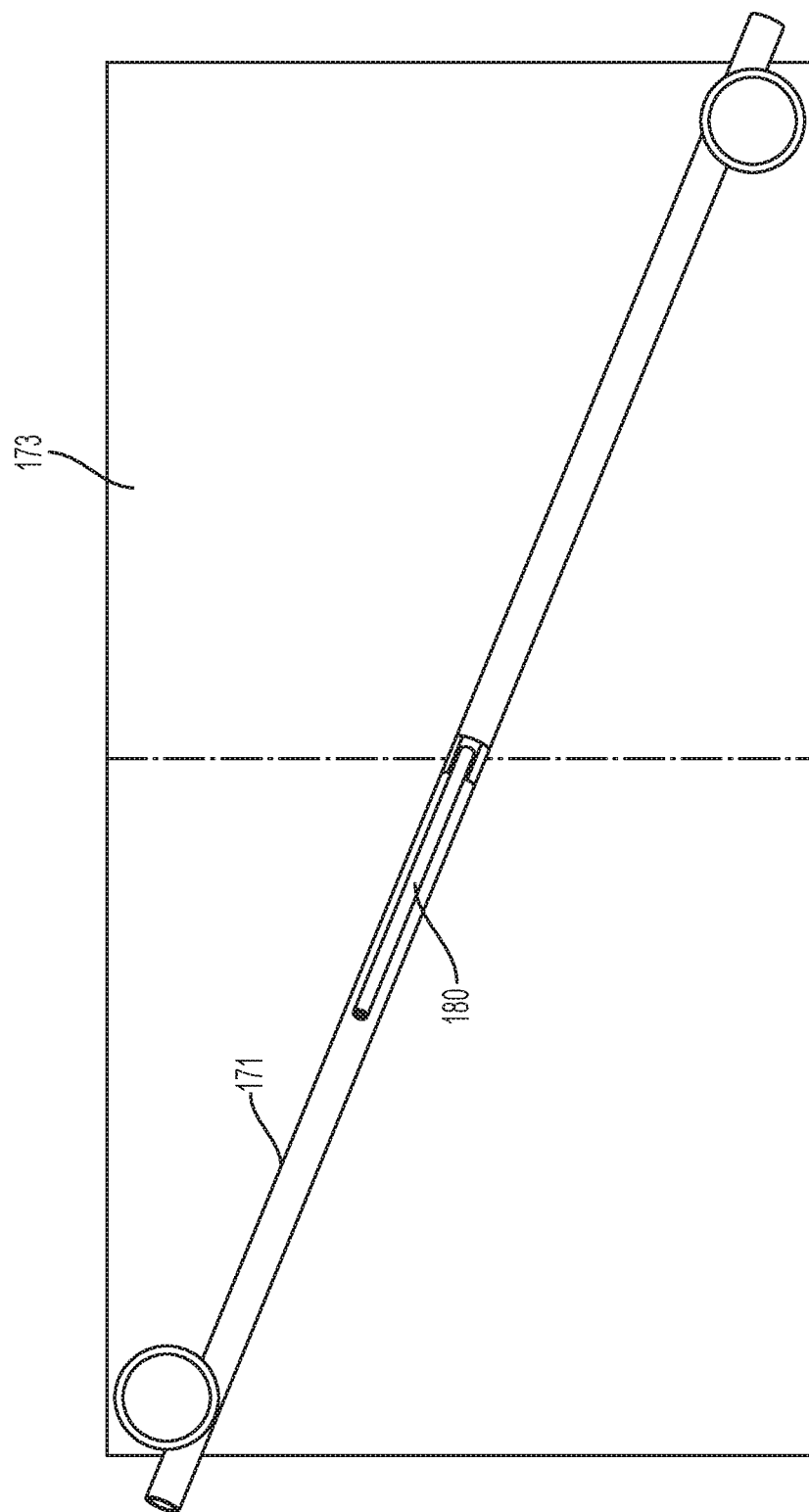
FIG. 19 is a top view of the cannulation fixture of FIG. 17.

In an eighth skill set, the user may perform a cannulation task by first emplacing in the base 23 a LST cannulation fixture 170, shown in FIGS. 17-19. The LST cannulation fixture 170 includes a cannulation tube 171 secured to a cannulation base 173 by a first clamp 175 and a second clamp 177. The cannulation base 173 may be attached to the base 23 by a hook-and-pile fastener 169. The task requires the user to insert a LST catheter 180 into a cannulation tube opening 179 in the cannulation tube 171 such that a catheter mark 181 is moved into position proximate the cannulation tube opening 179.

The catheter 180 may be provided with a metal pin (not shown) at the entry end to assist in guiding the catheter 180 into the cannulation tube opening 179. Moreover, the catheter 180 may include circumferential lines (not shown), in black ink for example, to indicate to the practitioner of the eighth skill set the depth to which the catheter 180 has entered the cannulation tube 171 via the cannulation tube opening 179.

Figure 20:
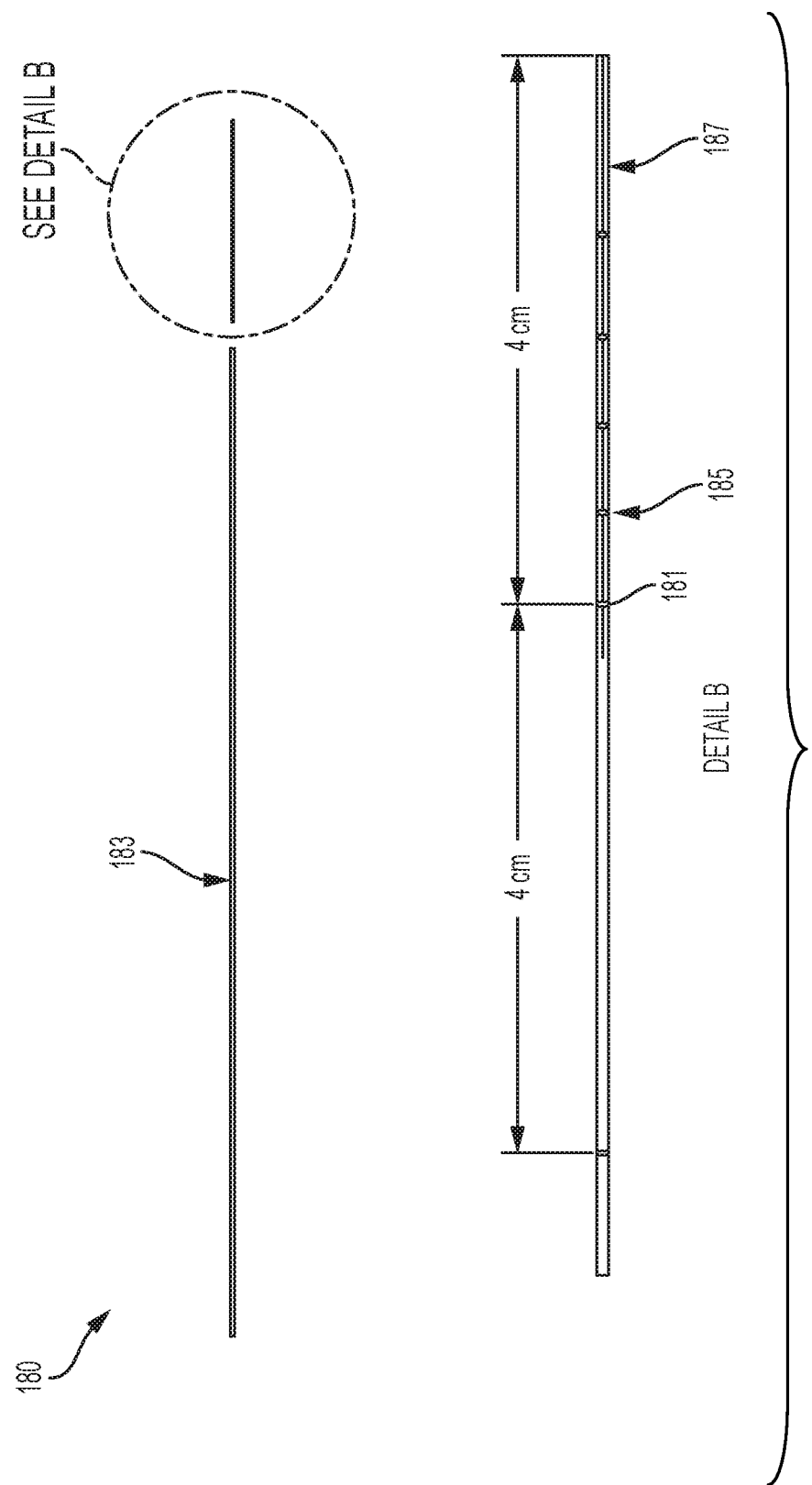
FIG. 20 is a diagrammatical illustration of the training catheter inserted into the cannulation fixture of FIG. 17.

The LST catheter 180 may alternatively include a marking string 185 (with marks) placed inside a catheter outer tube 183, as shown in FIG. 20. The marking string 185 is attached to a catheter pin 187, and includes the catheter mark 181 placed adjacent a cannulation tube mark 189, as shown. The marking string 185 may function to indicate to the practitioner of the eighth skill set the depth to which the catheter 180 has entered the cannulation tube 171 via the cannulation tube opening 179.

It is to be understood that the description herein is exemplary of the disclosure only and is intended to provide an overview for the understanding of the nature and character of the disclosure as it is defined by the claims. The accompanying drawings are included to provide a further understanding of various features and embodiments of the method and apparatus of the disclosure which, together with their description serve to explain the principles and operation of the disclosure.

Thus, as stated above, while the disclosure has been described with reference to particular embodiments, it will be understood that the present disclosure is by no means limited to the particular constructions and methods herein disclosed and/or shown in the drawings, but also comprises any modifications or equivalents within the scope of the claims. Further, the purpose of the Abstract is to enable the U.S. Patent and Trademark Office, the public generally, and in particular practitioners in the art who are not familiar with patent or legal terms or phraseology, to determine from a cursory inspection the nature and essence of the technical disclosure of the application. Accordingly, the Abstract is not intended to define nor limit the claims in any way.

What is claimed is:

1. A system comprising:
   an endoscope comprising a viewing barrel and an inner barrel, the inner barrel being slidably retained within the viewing barrel;
   a video camera connected to the endoscope, the video camera configured to generate a digital image;
   a video electronic module connected to the endoscope, the module configured to receive the digital image from the video camera; and
   a display operatively coupled to the video electronic module, the display configured to present the digital image from the video camera and an electronically generated image on the display.

2. The system of claim 1, wherein the video electronic module provides both the digital image from the video camera and the electronically generated image to the display.

3. The system of claim 1, wherein the electronically generated image overlays the digital image from the video camera when presented on the display.

4. The system of claim 1, wherein the video electronic module includes at least one switch, the at least one switch configured to manipulate the electronically generated image presented on the display.

5. The system of claim 1, wherein the endoscope is configured to operate in a first mode and a second mode, wherein in the first mode the video camera is aligned with a barrel axis of the endoscope, and in the second mode the video camera is positioned at an angle relative to the barrel axis.

6. The system of claim 1, wherein the video camera is adjustable along one end of the endoscope so as to continuously vary an angle of the video camera relative to the barrel axis of the endoscope.

7. The system of claim 1, wherein the electronically generated image includes a plurality of concentric circles and a plurality of parallel lines, the plurality of parallel lines being secant lines relative to at least one of the plurality of concentric circles.

8. The system of claim 1, wherein the electronically generated image includes a set of crosshairs, the set of crosshairs providing an outline of a target.

9. The system of claim 8, wherein the outline comprises at least two concentric circles and at least two parallel horizontal lines, the at least two parallel horizontal lines disposed within the at least two concentric circles.

10. The system of claim 1, wherein the electronically generated image further includes at least one of a countdown timer and an elapsed time timer.

11. The system of claim 10, wherein the video electronic module includes one or more switches to activate at least one of the countdown timer and the elapsed time timer presented within the electronically generated image.

12. The system of claim 1, wherein the display is configured to present at least one of a countdown timer and an elapsed time timer in addition to the digital image and the electronically generated image.

13. The system of claim 12, wherein at least one of the countdown timer and the elapsed time timer are superimposed onto the electronically generated image.

14. The system of claim 1, wherein the display is further configured to simultaneously present at least one of a countdown timer and an elapsed time timer with at least one of the digital image and the electronically generated image.

15. The system of claim 1, wherein the video electronic module is connected to a first end of the inner barrel of the endoscope and the video camera is connected to a second end of the inner barrel opposite the first end.

16. The system of claim 1, further comprising an elastic member disposed within the inner barrel of the endoscope and attached to the video camera, the elastic member configured to urge the video camera to rotate against a skewed barrel end of the viewing barrel.

17. The system of claim 1, further comprising a cable within the inner barrel of the endoscope, the cable configured to convey the digital image from the video camera to the video electronic module.

18. The system of claim 1, wherein the inner barrel includes a length longer than a length of the viewing barrel, such that movement of the inner barrel within the viewing barrel allows the video camera to rotate against a skewed barrel end of the viewing barrel and thereby change an angle of the video camera relative to a barrel axis of the endoscope.

19. The system of claim 18, wherein the angle of the video camera is continuously adjustable relative to the barrel axis of the endoscope.

20. The system of claim 18, wherein the angle of the video camera is adjustable between 0 and 30 degrees relative to the barrel axis of the endoscope.

21. The system of claim 18, wherein movement of the inner barrel relative to the viewing barrel is in a rearward direction along the barrel axis of the endoscope.

22. The system of claim 1, wherein the inner barrel includes a retractable latch, the retractable latch configured to extend above an outer surface of the inner barrel so as to prevent forward movement of the inner barrel within the viewing barrel.

\* \* \* \* \*